(12) United States Patent
Maurel

(10) Patent No.: US 8,632,193 B2
(45) Date of Patent: Jan. 21, 2014

(54) ACTIVE DISPLAY IMAGING SYSTEM PROVIDED WITH AN EYECUP

(75) Inventor: Gilles Maurel, Bois d'Arcy (FR)

(73) Assignee: Thales, Neuilly sur Seine (FR)

( * ) Notice: Subject to any disclaimer, the term of this patent is extended or adjusted under 35 U.S.C. 154(b) by 141 days.

(21) Appl. No.: 13/260,712

(22) PCT Filed: Mar. 2, 2010

(86) PCT No.: PCT/EP2010/052627
§ 371 (c)(1),
(2), (4) Date: Oct. 4, 2011

(87) PCT Pub. No.: WO2010/108764
PCT Pub. Date: Sep. 30, 2010

(65) Prior Publication Data
US 2012/0019919 A1    Jan. 26, 2012

(30) Foreign Application Priority Data

Mar. 27, 2009    (FR) ...................................... 09 01502

(51) Int. Cl.
*G02B 21/00*    (2006.01)
(52) U.S. Cl.
USPC ...................................................... 359/600
(58) Field of Classification Search
USPC .................. 359/402, 406, 511, 600, 601, 611
See application file for complete search history.

(56) References Cited

U.S. PATENT DOCUMENTS

| | | | |
|---|---|---|---|
| 4,523,818 A * | 6/1985 | Lang et al. ................... | 359/600 |
| 4,601,540 A | 7/1986 | Karning et al. | |
| 4,698,857 A * | 10/1987 | Kastendieck et al. ............ | 2/426 |
| 5,408,359 A * | 4/1995 | Ferrett et al. .................. | 359/601 |
| 6,341,014 B1 | 1/2002 | Maurel et al. | |
| 6,382,801 B1 | 5/2002 | Maciejewski et al. | |
| 7,270,301 B2 | 9/2007 | Maurel | |
| 2008/0114425 A1* | 5/2008 | Korb et al. ...................... | 607/96 |
| 2009/0020170 A1* | 1/2009 | Anderson et al. .......... | 137/492.5 |

FOREIGN PATENT DOCUMENTS

DE    29612466 U1    10/1996

OTHER PUBLICATIONS

MEMS Mass Flow Sensor D6F-P0010A—Specifications, Omron Electonic Components, LLC.
Micro Diaphragm Pumps—Specifications, thin XXS Microtechnology AG, Germany.

* cited by examiner

*Primary Examiner* — Alessandro Amari
*Assistant Examiner* — Jie Lei
(74) *Attorney, Agent, or Firm* — Baker & Hostetler LLP

(57) ABSTRACT

An imaging system comprises an active display and a flexible eyecup made of a light-proof material, arranged around the active display and intended to eliminate the leakages of light between the active display and an observer. The imaging system comprises: pumping means capable of creating an air pressure difference between the inside and the outside of the eyecup, means for switching on the active display when a threshold pressure difference, called switching-on pressure Pa, is reached between the inside and the outside of the eyecup.

19 Claims, 3 Drawing Sheets

ACTIVE DISPLAY IMAGING SYSTEM PROVIDED WITH AN EYECUP

CROSS-REFERENCE TO RELATED APPLICATIONS

This application is a National Stage of International patent application PCT/EP2010/052627, filed on Mar. 2, 2010, which claims priority to foreign French patent application No. FR 0901502, filed on Mar. 27, 2009, the disclosures of which are incorporated by reference in their entirety.

FIELD OF THE INVENTION

The field of the invention is that of imaging systems equipped with an eyepiece with active display.

BACKGROUND

When observing a scene with an imaging system, the observer watches, in an eyepiece (or a pair of eyepieces), the image created by the active display. The space between the eye of the observer and the eyepiece 3 allows light from the display to escape, as illustrated in FIG. 1.

A first solution for eliminating these leakages of light consists in using an eyecup, usually made of flexible rubber, which fits exactly around the eye, or a mask which surrounds both eyes. FIG. 2 shows an example of a mask 10' with which an imaging system is equipped, in this case an IR camera 1. This eyecup and this mask are called eyecup. This solution is insufficient, because it does not guarantee optical seal-tightness, notably when the observer moves the imaging system away without first switching off the display. Furthermore, there can also be leakages of light because the eyecup, flexible or rigid, is not in perfect contact all around the surround of the eye.

A second solution consists in complementing the preceding solution with an electro-optical device which is capable of detecting the presence of the eye at the right distance on each eyepiece and capable of switching on the display only when the presence of the eyes in the right place is confirmed. Such an imaging system is complicated and not necessarily compatible with camera usage conditions (dust, rain, etc.). Furthermore, this kind of electro-optical device emits light and is therefore not stealthy.

A third solution is to place, in the eyecup, a switch which switches on the display by means of a pressure of the eyecup on the observer. The drawback with this solution is that it does not guarantee that the light will not leak. In practice, the display can be switched on simply by pressing on the switch with the hands, for example.

SUMMARY OF THE INVENTION

The aim of the invention is to avoid the leakages of light between an imaging system and an observer.

The inventive solution is founded on the principle according to which the light inside an eyecup does not leak if air does not leak.

More specifically, the subject of the invention is an imaging system which comprises an active display and a flexible eyecup made of a light-proof material, arranged around the active display and intended to eliminate the leakages of light between the active display and an observer. It is mainly characterized in that it comprises:
 a. pumping means capable of creating an air pressure difference between the inside and the outside of the eyecup,
 b. means for switching on the active display when a threshold pressure difference, called switching-on pressure Pa, is reached.

In this way, when an overpressurization (or an underpressurization) inside the eyecup compared to the outside is detected, the active display is switched on.

Preferably, the means for switching on the display include means for determining the air pressure Pi inside the eyecup. These are, for example, a pressure sensor arranged inside the eyecup or a flowmeter capable of measuring the pumped air flow. The air pressure Pe outside the eyecup can be measured with an additional sensor or by memory effect on the sensor situated inside the eyecup.

According to a characteristic of the invention, the eyecup including at least one wall, the pumping means include a pipe passing through the wall(s) of the eyecup.

According to another characteristic of the invention, the eyecup includes an inside wall and an outside wall between which a space is formed; the inside wall includes microchannels which pass through it, and the pumping means include a pipe which passes through the outside wall of the eyecup.

It possibly includes a pumped air regulator linked to the pumping means.

The means for switching on the active display advantageously include means for comparing the air pressure difference |Pi−Pe| to a threshold pressure.

The air pumping means are capable of pulsing air into the eyecup or, according to a variant, they are capable of sucking air from the eyecup.

When the pumping means are capable of pulsing air into the eyecup, the system may include a dust filter.

The eyecup may include micro-holes passing through its wall or walls from side to side to avoid an excessive air pressure Pi inside the eyecup. In this case, there are chicanes between the inside wall and the outside wall so as to avoid the direct leakages of light through the micro-holes.

The eyecup is, for example, of mask type and is intended to be adapted to both eyes of the observer, or to one eye of the observer.

This imaging system is, for example, a camera or a light amplifying system.

BRIEF DESCRIPTION OF THE DRAWINGS

Other features and advantages of the invention will become apparent from reading the following detailed description, given as a nonlimiting example and with reference to the appended drawings in which.

From one figure to another, the same elements are identified by the same references.

DETAILED DESCRIPTION

According to the invention, the imaging system that makes it possible to avoid the leakages of light between the display and the observer comprises a flexible protective eyecup, provided with means for monitoring the leakages of air between the inside of the eyecup when it is in the optically light-proof position on the observer, and the outside.

The eyecup is in position on the observer when an air pressure difference is maintained between the inside of the enclosure formed by the display, the eyecup and the observer, and the outside of this enclosure. Hereinafter, the term "inside" when applied to the eyecup will refer to the inside of this enclosure.

Figure 1:
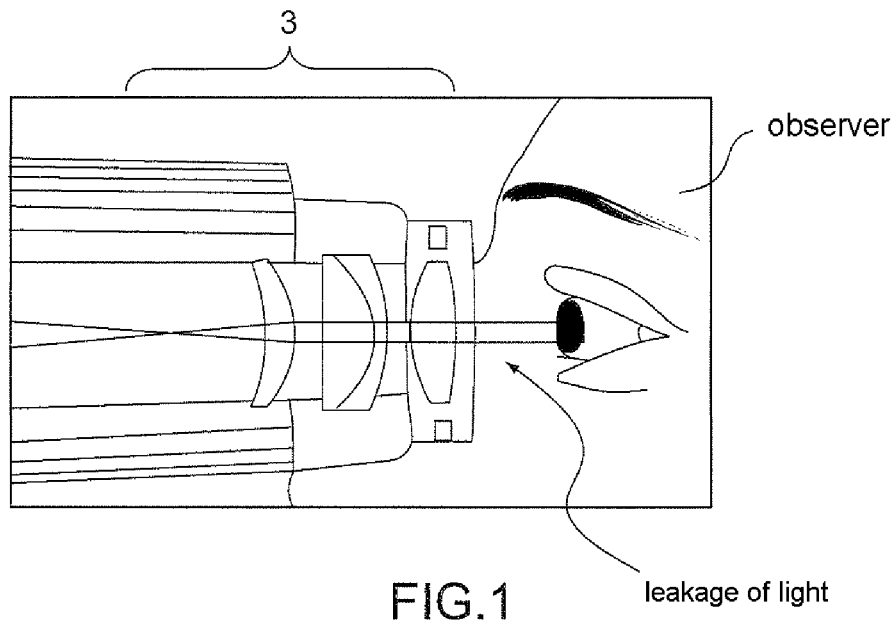
FIG. 1, already described, schematically illustrates the leakages of light between the eyepiece of an imaging system and an observer, FIG. 2, already described, schematically represents an imaging system, in this case an IR camera equipped with an eyecup, according to the state of the art, FIG. 3 schematically represents a front view, in cross section of an exemplary eyecup for an imaging system according to the invention.
Figure 2:
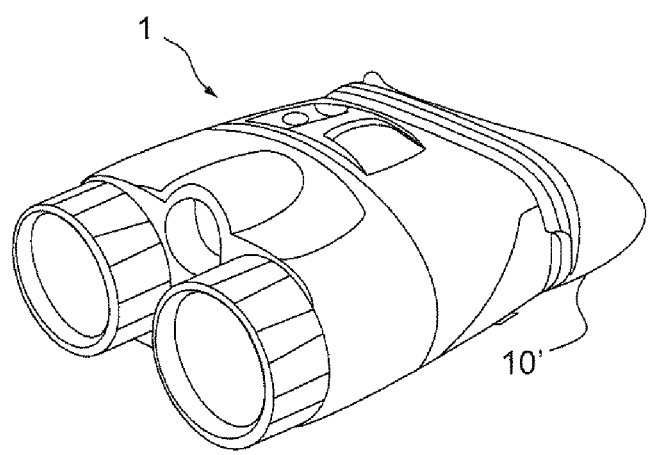
Figure 3:
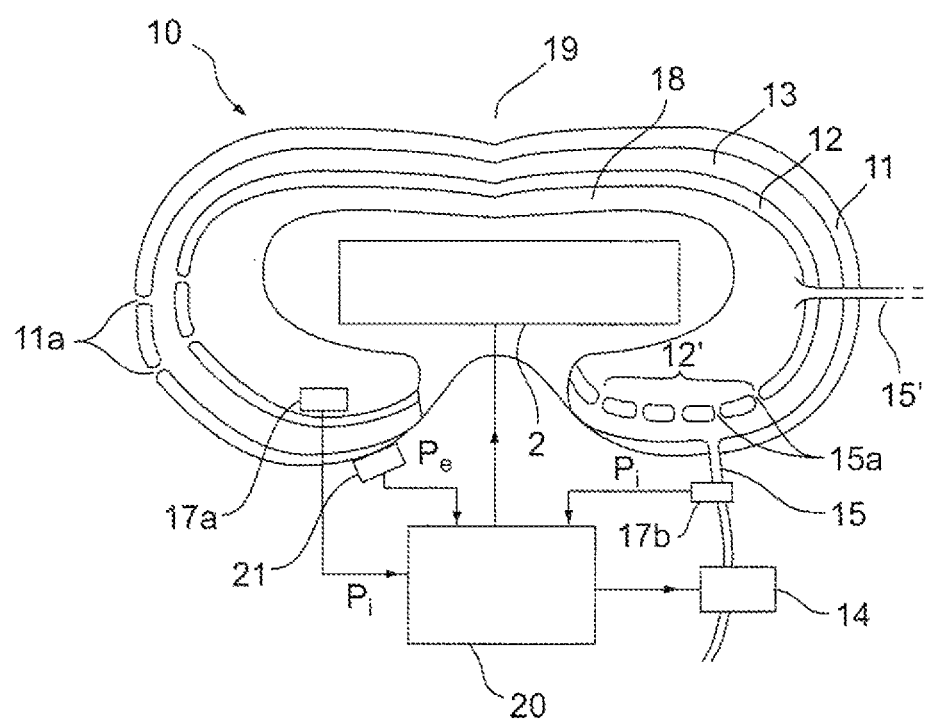

According to the invention described in relation to FIG. 3, the eyecup 10 is equipped:
with means for creating an air pressure difference between the inside of the eyecup and the outside, and
means for switching on the display when a threshold pressure, called switching-on pressure is reached.

The protection eyecup is made of a light-proof material and sufficiently air-tight to achieve this pressure difference by reasonable pumping; examples of such a material may be rubber or a black foam or any other material having the properties mentioned.

The means for creating an air pressure difference between the inside 18 and the outside 19 of this eyecup comprise an air micro-pump 14 linked to the inside and to the outside and means for implementing this pump. This is, for example, a micro-pump of "thinXXS micropump" type.

According to a first embodiment, the pump is, for example, linked to the inside and the outside of the protection eyecup by a hollow flexible pipe 15' which passes through the wall of the eyecup or the walls 11, 12 when it has two or even more thereof.

According to another embodiment, the eyecup includes an inside wall 12 and an outside wall 11 between which a space 13 is formed. The two walls may be of the same light-proof material and sufficiently air-tight, such as rubber or a black foam or any other material having the properties mentioned. They may also be made of a different material, at least one of them being light-proof and air-tight: the outside wall is typically made of rubber, the inside wall being made of foam.

Micro-channels 15a are formed in the inside wall and pass through it (these micro-channels are represented on an area 12' of the wall); this inside wall is then made of a material that is at least air-tight, the outside wall being made of a light-proof material that is sufficiently air-tight. The pump 14 is then linked to the inside 18 on the one hand by a pipe which passes through the outside wall 11 and which opens into the space 13 between the two walls; it is also linked to the inside 18 by these micro-channels 15a. These micro-channels typically have a diameter of approximately $1/10^{th}$ mm. This embodiment ensures a better spatial distribution of the air pumped into the eyecup.

According to a variant, the pump 14 is linked to the outside 19 of the eyecup via the inside of the imaging system (the expression "inside of the imaging system" designating the imaging system without the eyecup) then making a pipe passing through the wall or walls of the eyecup superfluous. The pump 14 which can also be arranged inside the imaging system, is linked to the inside 18 of the eyecup by a pipe opening directly into the eyecup or into the space 13 between the walls, the other end of the pipe opening on the outside of the imaging system.

The means for switching on the display 2 when a threshold pressure difference called switching-on pressure is reached, are, for example, reduced to a switch actuated by the observer which by itself determines whether the threshold pressure is reached or which is informed thereof by a sound or other signal.

Preferably, the means for switching on the display 2 when a threshold pressure difference called switching-on pressure is reached, include automatic means for determining the inside air pressure Pi and the outside air pressure Pe of the eyecup and automatic means for comparing the pressure difference |Pi−Pe| to a threshold pressure, linked to display triggering means.

The means for determining the air pressure comprise, for example, a flowmeter 17b arranged on the path of the pumped air, which indirectly determines the pressure Pi via the pumped air flow. It may also be a pressure sensor 17a situated on this same path or arranged inside the eyecup, which directly measures the pressure Pi. The air pressure Pe outside the eyecup can be measured with an additional sensor 21 arranged outside the eyecup or by memory effect on the sensor 17a situated inside the eyecup: Pe is then equal to the pressure measured a short time after the imaging system is powered up. It is possible, for example, to use a micro-sensor of MEMS (Micro Electro Mechanical System) type. There are micro-sensors of very small dimensions, such as $2\times2\times1.5$ mm$^3$.

The means 20 for switching on the display 2 also include means for comparing the pressure difference |Pi−Pe| determined in this way (directly or indirectly), to a predetermined threshold pressure, called switching-on pressure Pa, above which the display 2 is switched on and below which it is switched off. This pressure Pa is generally previously stored in these comparison means. This comparison element is, for example, a logic circuit or an analogue circuit or a combination of analogue and logic circuits; it may be arranged inside the imaging system.

There are various ways of implementing the pump 14. It can be controlled directly by the observer by means of a switch for example. It may also be controlled by means 20 for triggering the display which activate the pump 14 as long as the pressure difference |Pi−Pe| has not reached the threshold pressure Pa and deactivate it when this threshold or another threshold is reached. In this case, the observer starts up these triggering means.

If appropriate, the eyecup is also provided with a pressure regulator linked to the means for determining the pressure Pi, to the pump and possibly to the display triggering means. When the display 2 is switched on, the regulator activates or deactivates the pump 14 to maintain the pressure difference |Pi−Pe| at an optimum pressure close to Pa: according to the difference tolerated between the pressure difference |Pi−Pe| and this optimum operating pressure Pf, the regulator activates or deactivates the pump. This regulator may also provide a safety function, it activates or deactivates the pump 14 according to the difference tolerated between the pressure sensed inside Pi and a threshold pressure, called safety pressure Ps.

Figure 4:
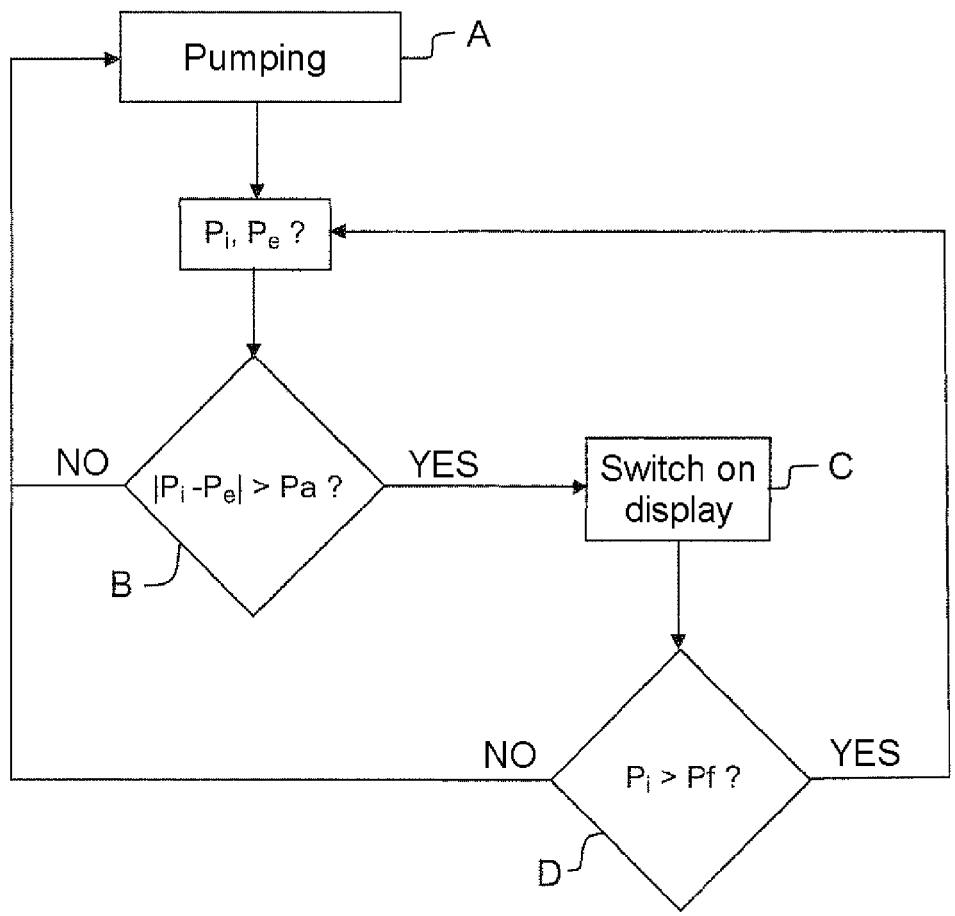
FIG. 4 is a flow diagram describing the operation of an example of display triggering means according to the invention.

This regulation is, for example, handled by the triggering means 20 as illustrated in FIGS. 3 and 4. The operation of these triggering means 20 is described in relation to the flow diagram of FIG. 4. When the pump 14 is implemented (step A), the pressure difference |Pi−Pe| is compared to the switching-on pressure Pa (step B):
if |Pi−Pe|<Pa, the pumping is insufficient and the step A is reiterated, otherwise the display 2 is switched on (step C).
The pressure difference is then compared to the optimum operating pressure Pf (step D):
if |Pi−Pe|<Pf, the pumping is maintained and the step A is reiterated, otherwise it is deactivated.

This regulation function may also be handled by a regulator separate from these triggering means 20 which may be linked only to the means 17a for determining the pressure Pi, and to the pump 14.

Up to now, the display 2 has been triggered when the pressure difference between the inside 18 and the outside 19 of the eyecup is based on an inside pressure Pi, greater than the outside ambient pressure Pe, that is to say based on an overpressurization of the inside of the eyecup: Pi>Pe. In this case, the pump 14 acts so as to pulse air from the outside 19 to the inside 18. A dust filter can then be added to this equipment.

According to an alternative, the display 2 is switched on when the pressure difference between the inside and the outside of the eyecup is based on an inside pressure Pi, lower than the outside ambient pressure Pe, that is to say based on an underpressurization of the inside of the eyecup: Pi<Pe. In this case, the pump acts so as to suck air from the inside to the outside. The steps for comparing the inside pressure Pi to the threshold pressures, Pa and Ps, are then reversed: the display is switched on if Pi<Pa and the pumping is deactivated if Pi<Ps.

The eyecup may include holes 11a called pressurization holes, whose function is to avoid an excessive pressure (too high or too low depending on whether it concerns an overpressurization or an underpressurization) inside 18, which could damage the eyes of the observer, or to avoid an excessive pressure difference |Pi−Pe|. These pressurization holes pass through the walls 11 and 12 of the eyecup (or its wall) from side to side through the thickness, on a path that includes optical chicanes. These typically have a diameter of approximately $1/20^{th}$ of a millimeter; they are small enough for a sufficient pressure difference to be maintained between the inside and the outside of the eyecup without excessive pumping.

The eyecup is, for example, of the eyecup type and is intended to be adapted to an eye of the observer or is of mask type and is intended to be adapted to both eyes of the observer, the means described being duplicated (one part for each eye) if necessary; the pump may, however, be common to both parts.

The outside elements of the eyecup represented in a functional manner in FIG. 3 are in practice arranged ergonomically so as not to hamper the observer.

This imaging system is, for example, an IR camera or an IR light amplifying system.

The invention claimed is:

1. An imaging system, comprising:
   an active display;
   a flexible eyecup made of a light-proof material, the flexible eyecup arranged around the active display with an inside of the eyecup being in optical communication with the active display, and intended to eliminate leakages of light between the active display and an observer;
   pumping means for creating an air pressure difference between the inside of the eyecup and an outside of the eyecup; and
   means for switching on the active display when a threshold pressure difference, called a switching-on pressure (Pa), is reached between the inside of the eyecup and the outside of the eyecup.

2. The imaging system as claimed in claim 1, wherein the means for switching on the display includes means for determining an air pressure (Pi) inside the eyecup and an air pressure (Pe) outside the eyecup.

3. The imaging system as claimed in claim 2, wherein the means for determining the air pressure is a pressure sensor arranged inside the eyecup or a flowmeter for measuring the pumped air flow.

4. The imaging system as claimed in claim 2, wherein the means for switching on the active display includes means for comparing the air pressure difference |Pi-Pe| to a threshold pressure.

5. The imaging system as claimed in claim 1, wherein the eyecup includes at least one wall, and the pumping means includes a pipe passing through the the at least one wall of the eyecup.

6. The imaging system as claimed in claim 1, wherein
   the eyecup includes an inside wall and an outside wall defining a space therebetween,
   the inside wall includes micro-channels therethrough, and
   the pumping means includes a pipe passing through the outside wall of the eyecup.

7. The imaging system as claimed in claim 1, wherein the pumping means includes a pipe arranged inside the imaging system which designates the system without the eyecup, and linking the inside of the eyecup to the outside of the eyecup.

8. The imaging system as claimed in claim 1, further comprising a pumped air regulator linked to the pumping means.

9. The imaging system as claimed in claim 1, wherein the pumping means are configured to pulse air into the inside of the eyecup or to suck air away from inside the eyecup.

10. The imaging system as claimed in claim 1, wherein the pumping means is configured to pulse air into the inside of the eyecup, and the pumping means includes a dust filter.

11. The imaging system as claimed in claim 1, wherein the eyecup defines pressurization micro-holes through at least one wall of the eyecup, the pressurization micro-holes extending from side to side following a path with optical chicanes to avoid an excessive air pressure (Pi) inside the eyecup or an excessive pressure difference |Pi-Pe|.

12. The imaging system as claimed in claim 1, wherein the eyecup is of a mask type and is adapted to accommodate both eyes of the observer.

13. The imaging system as claimed in claim 1, wherein the system is a camera or a light amplifying system.

14. The imaging system as claimed in claim 1, wherein the eyecup is adapted to accommodate only one eye of the observer.

15. The imaging system as claimed in claim 1, wherein the eyecup is configured to effect fluid communication between the inside of the eyecup and an eye of the observer.

16. The imaging system as claimed in claim 1, wherein the inside of the eyecup is in fluid communication with the active display.

17. An imaging system, comprising:
    an active display;
    a flexible eyecup made of a light-proof material, the flexible eyecup arranged around the active display and intended to eliminate leakages of light between the active display and an observer, the eyecup configured to effect fluid communication between an inside of the eyecup and an eye of the observer;
    pumping means for creating an air pressure difference between the inside of the eyecup and an outside of the eyecup; and
    means for switching on the active display when a threshold pressure difference, called a switching-on pressure (Pa), is reached between the inside of the eyecup and the outside of the eyecup.

18. The imaging system as claimed in claim 17, wherein the inside of the eyecup is in optical communication with the active display.

19. The imaging system as claimed in claim 17, wherein the inside of the eyecup is in fluid communication with the active display.

* * * * *